June 28, 1966  S. W. SMITH  3,258,137
TOBACCO SPEARING APPARATUS
Filed Jan. 28, 1964  5 Sheets-Sheet 1
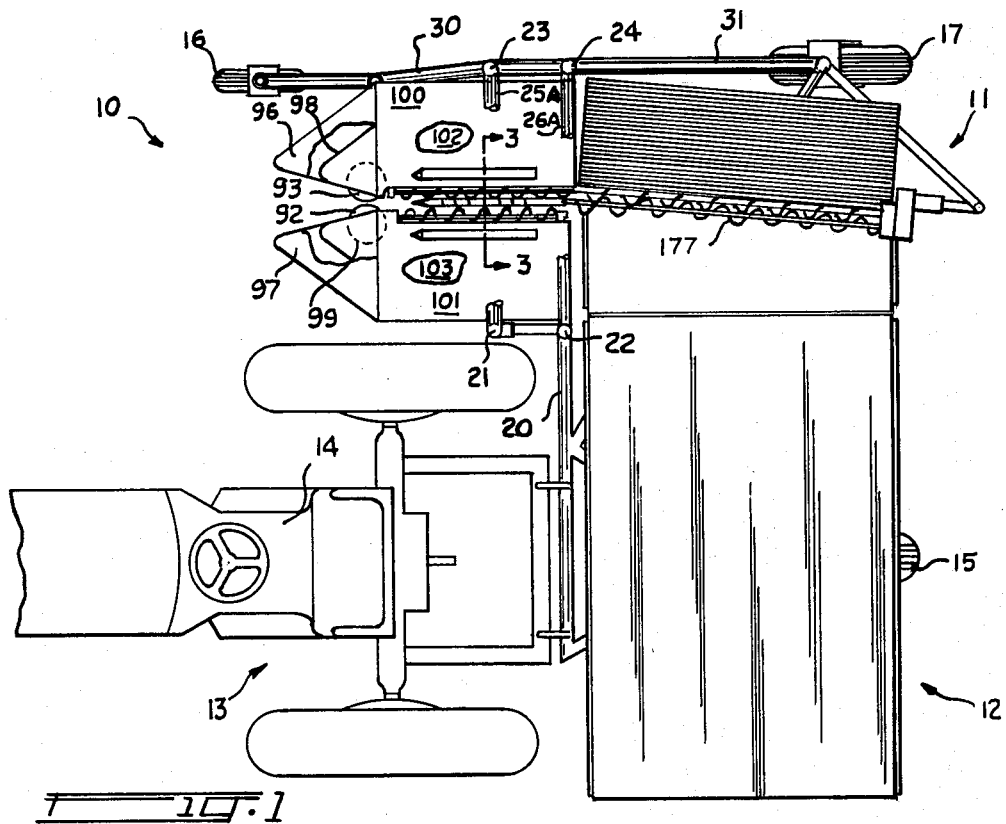
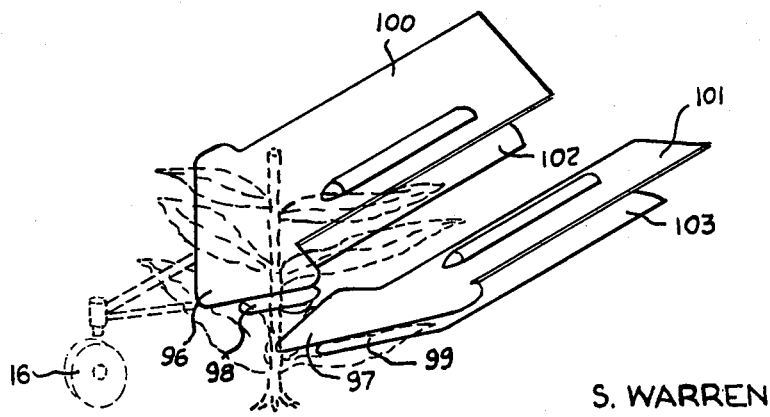
INVENTOR
S. WARREN SMITH
BY  W. E. Sherwood
ATTORNEY

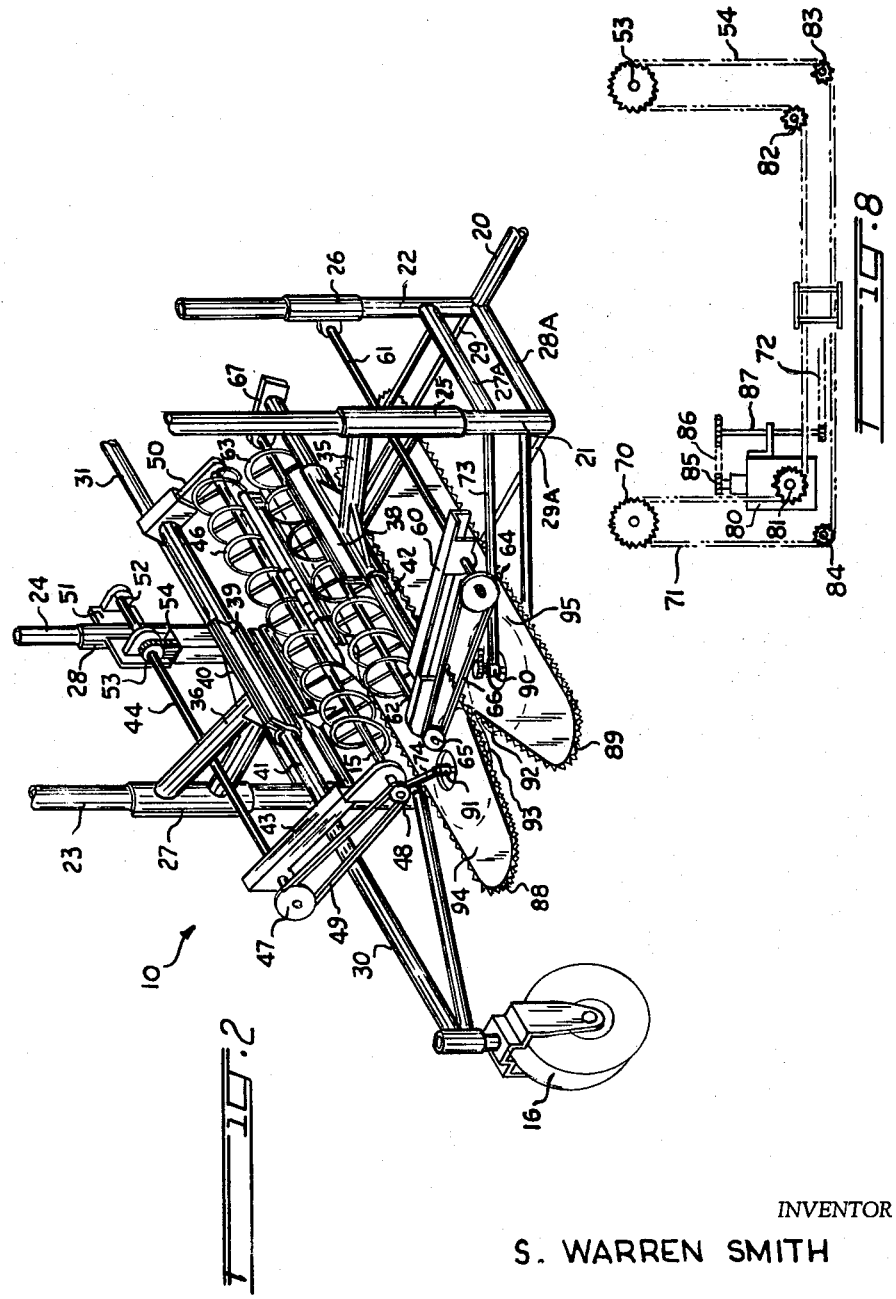

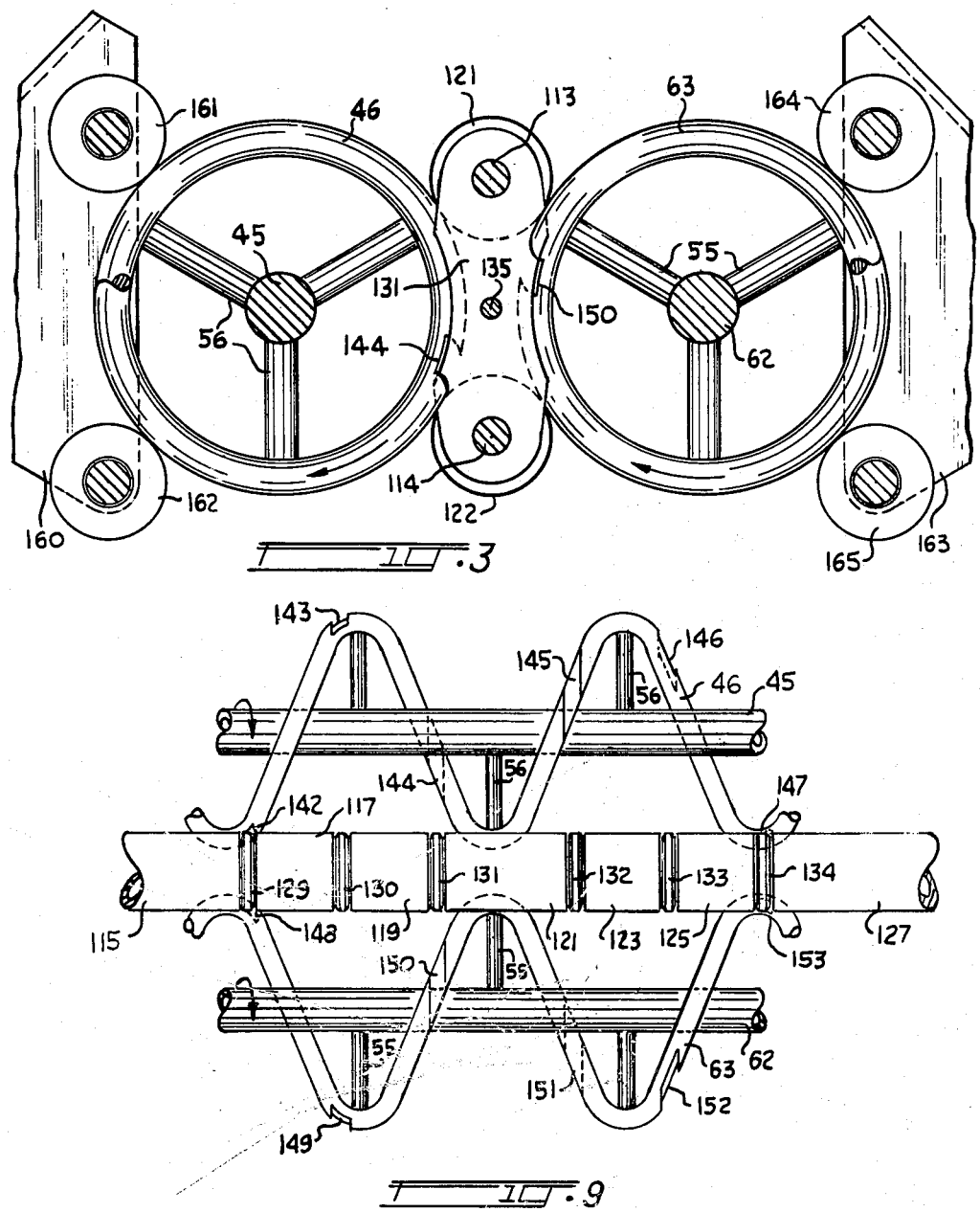

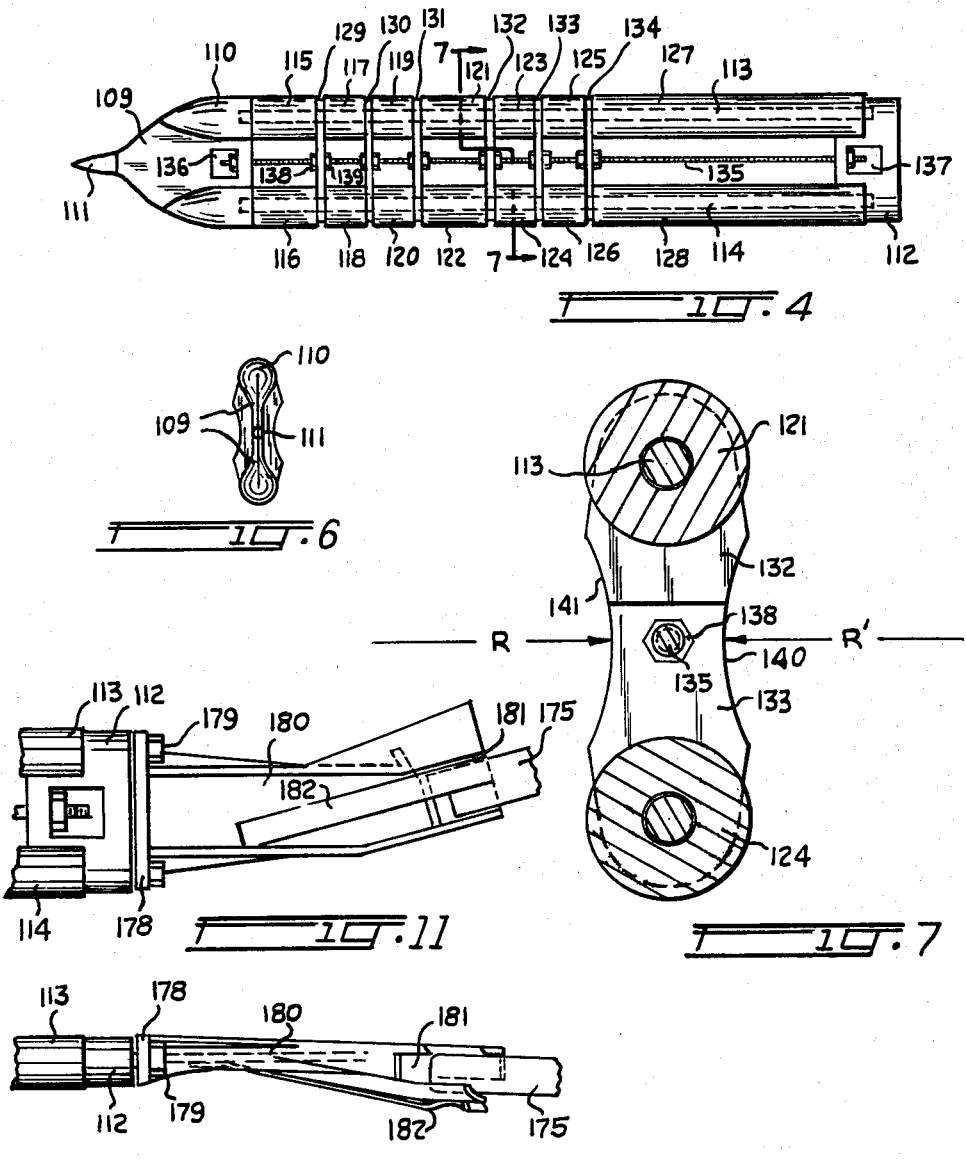

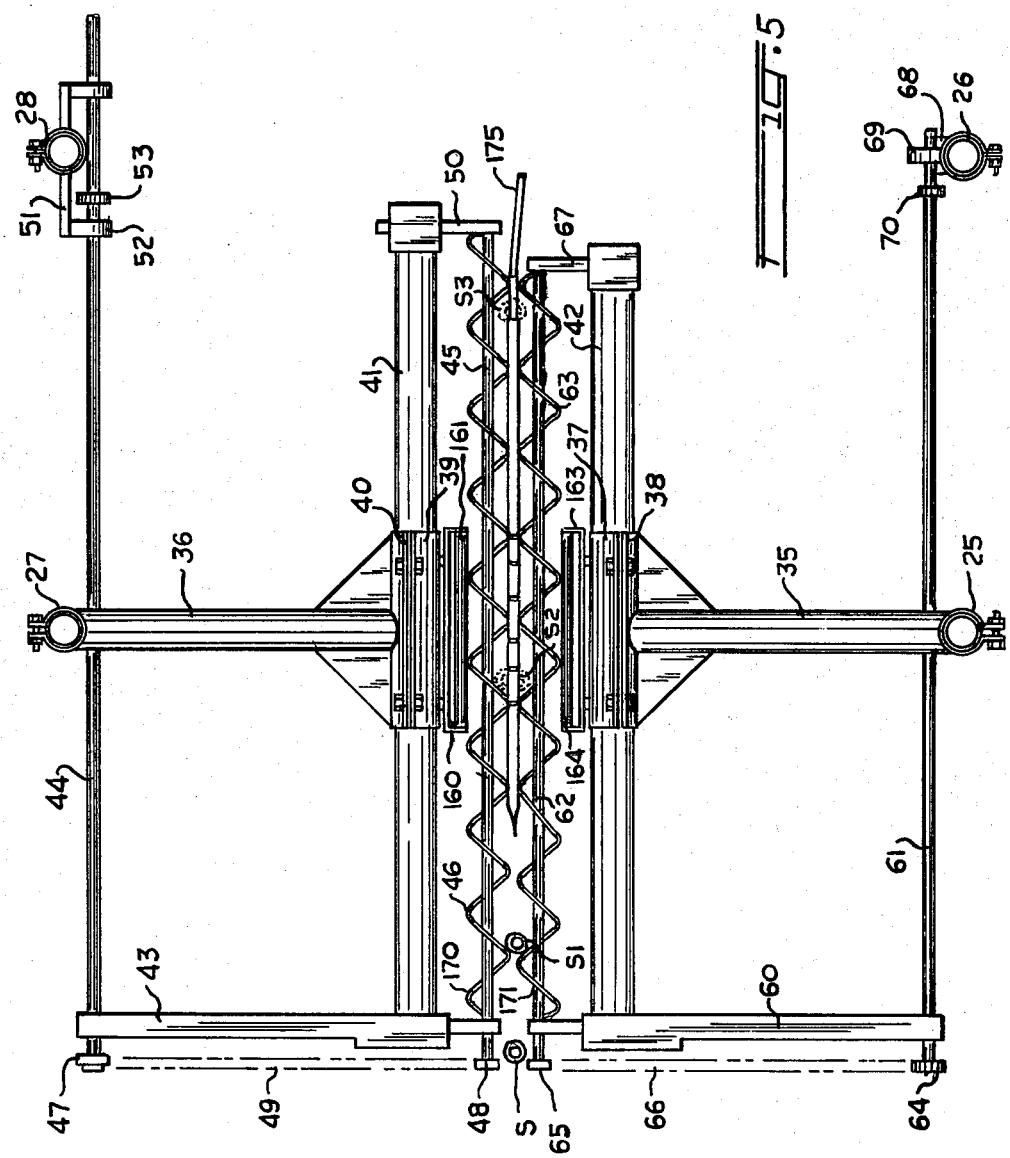

United States Patent Office 3,258,137
Patented June 28, 1966

3,258,137
TOBACCO SPEARING APPARATUS
Samuel Warren Smith, Lexington, Ky., assignor, by mesne assignments, to The Kentucky Research Foundation, Lexington, Ky., a corporation of Kentucky
Filed Jan. 28, 1964, Ser. No. 340,623
17 Claims. (Cl. 214—5.5)

This invention relates to a new and improved spearing apparatus for tobacco stalks and the like and more particularly to a floating type spear and its cooperating means for moving and guiding the stalk in a straight line motion to one end of the spear, along the spear and from the other end of the spear. The invention is equally adaptable to use with various forms of tobacco harvesting machines which pass through the field and harvest standing tobacco, or to use with previously cut tobacco stalks fed to the apparatus manually.

In the conventional practice of impaling tobacco stalks on a stick and thereafter curing the tobacco in barns prior to removal of the tobacco stalks from those sticks, the initial step of impaling the several stalks is of major importance. The size of the spear must be large enough to form a split in the stalk adequate to receive the stick but not so large as to result in such split extending to the butt end of he stalk and permitting the stalk to fall from the stick; the several stalks fed to the receiving stick from the spear must be spaced generally at uniform distances therealong in order to give an optimum curing action; the split formed in the stalk must be located generally along the longitudinal center line of the stalk; the spear must be capable of impaling stalks of varying diameters; the spear must accept stalks fed thereto with random spacings between successive stalks; and the tobacco leaves attached to the stalk must not be damaged to any significant extent during the spearing operation. It is a purpose of this invention to provide a spearing apparatus which is capable of meeting these and other requirements found in the harvesting of tobacco. Moreover, in its broader aspects the invention is not limited to the handling of tobacco alone but is to be considered as applicable to the spearing of any similar article having dimensions and other inherent characteristics which permit it to be handled by the apparatus, as hereinafter claimed.

An object of the invention is to provide a new and improved spearing apparatus including a floating spear supported upon rotating means for conveying and guiding the article to be impaled upon the spear.

Another object is to provide an improved spearing apparatus having an elongated spear cooperating with a guiding and conveying means for moving a series of articles to, along, and from the spear, and effecting a split in said article at an optimum location therein.

Another object is to provide an improved spearing apparatus having a floating spear supported upon rotating article conveying and guiding means and with the cooperating parts arranged to insure reduced friction and stoppages during operation.

Another object is to provide a tobacco spearing apparatus effecting a more uniform spearing of stalks at the optimum location, a reduced amount of manual effort, and a reduced amount of damage to tobacco leaves.

A further object is to provide a tobacco spearing apparatus which accepts and impales tobacco stalks fed thereto at random distances between successive stalks.

A further object is to provide a tobacco spearing apparatus which is independent of prior priming of the tobacco stalk to be speared.

A still further object is to provide an improved spear for use in a tobacco stalk spearing assembly.

Other objects and advantages of the inevntion will become more apparent as the description proceeds and when considered in conjunction with the accompanying drawings in which:

FIG. 1 is a plan view with parts broken away showing the spearing apparatus arranged upon a tobacco harvester.

FIG. 2 is a perspective view with parts broken away and with the shrouds removed and showing one form of structure for mounting the spearing apparatus upon the harvester and indicating the drive for the rotatable helical members thereof.

FIG. 3 is a cross-sectional view of a portion of the spearing apparatus to a larger scale and taken on line 3—3 of FIG. 1.

FIG. 4 is a side elevation view of the spear.

FIG. 5 is a plan view of the spear showing its floating relation to the portions of the helical members with which it is engaged.

FIG. 6 is a front end view of the spear of FIG. 4.

FIG. 7 is a sectional view of the spear taken on line 7—7 of FIG. 4 and to a larger scale and with the rollers shown in elevation.

FIG. 8 is a diagrammatic view indicating the chain drive for rotatable elements of the spearing apparatus.

FIG. 9 is a schematic view showing the arrangement of the key plates of the spear and of the cooperating slots of the helical members.

FIG. 10 is a diagrammatic view indicating the approach of the spearing apparatus to a tobacco stalk.

FIG. 11 is a side elevation view of the adapter at the rear end of the spear; and FIG. 12 is a top view of the adapter.

Referring first to FIG. 1, a typical use of the present invention may comprise the harvesting of standing tobacco in a field by means of a machine having a cutting and spearing assembly generally designated at 10, a stick filling and stick magazine assembly 11, a conveyor assembly 12 for filled sticks and a prime mover 13 for moving the several assemblies as a unit through the field. As will be understood, various forms of prime movers, filled-stick conveyors and stick filling assemblies may be employed, and as such form no part of the present invention and therefore, are disclosed only in general terms.

For example, a conventional tractor 14 tows at its rear and to one side a framework supported upon swivelled, ground-engaging wheels 15, 16 and 17. This framework is disposed a sufficient distance above the ground to clear the stubs of previously cut stalks and has mounted thereon a suitable drive means 80 (FIG. 8) for driving the several rotatable elements of the assembly 10 under control of the driver of the tractor. Extending laterally of the framework is a strong beam 20 attached to the supporting structure or frame of the cutting and spearing assembly 10 as best shown in FIG. 2. This structure comprises two pairs of upright tubular posts 21, 22 and 23, 24 and along which tubular sleeves 25, 26, 27 and 28 may be selectively positioned vertically for a purpose later to appear. The posts 21 and 23 and the posts 22 and 24 preferably are joined overhead at their upper ends by cross bars 25A and 26A to provide reinforcement, and each post in each pair is joined to the other by lower braces as indicated at 27A and 28A. Furthermore, a lower cross bar 29 joins the lower ends of the posts 22 and 24 and a similar cross bar 29A joins the posts 21 and 23. Projecting forwardly of post 23 along the far side of the assembly 10 is a rod 30 for mounting wheel 16 and projecting rearwardly of post 24 is a rod 31 connected to the structure of the stick filling and stick magazine assembly 11, which is supported by the wheel 17.

Considering now FIGS. 2 and 5, the respective tubular sleeves 25, 26, 27 and 28 serve as adjustable supports for the spearing apparatus. Projecting inwardly from each of sleeves 25 and 27 and rigidly attached thereto are cantilever arms 35 and 36 carrying at their respective distal ends pairs of clamping plates 37, 38 and 39, 40. These plates are adapted to embrace the mid-sections of a first rod 41 and a second rod 42 which are inclined slightly downward toward the front end of the spearing apparatus, for example, at a slope of about 5°. At the front end of rod 41, which is slightly longer than rod 42, a transverse bar 43 is rigidly attached, at a point intermediate the ends of that bar, to the rod 41. The outwardly projecting section of bar 43 has an opening therein containing a bushing and in which a first drive shaft 44 is journalled for rotation. The inwardly projecting section of bar 43 likewise has an opening therein containing a bushing and in which the central shaft 45 of a first helical member 46 is journalled for rotation. The forward ends of shafts 44 and 45 carry sprockets 47 and 48 respectively and which are interconnected by a chain 49. Also rigidly attached to rod 41 at its rear end is a transverse arm 50 the distal end of which contains a bushing journalling the rear end of central shaft 45 therein for rotation. Mounted upon sleeve 28 is a plate 51 carrying a bracket 52 with a bushing therein for rotatably supporting the rear end of the first drive shaft 44, and attached to the shaft adjacent this bracket is a sprocket 53 driven by a vertically extending chain portion 54, as best shown in FIG. 8.

Similarly, plates 37 and 38 embrace rod 42, at the front end of which a transverse bar 60 is rigidly attached. The outwardly projecting section of bar 60 has an opening therein containing a bushing and in which a second drive shaft 61 is journalled for rotation. The inwardly projecting section of bar 60 likewise has an opening therein containing a bushing and in which the central shaft 62 of a second helical member 63 is journalled for rotation. The forward ends of shafts 61 and 62 carry sprockets 64 and 65, respectively, and which are interconnected by chain 66. Also rigidly attached to rod 42 at its rear end is a transverse arm 67 the distal end of which contains a bushing journalling the rear end of central shaft 62 therein for rotation. As shown in FIG. 5 the arm 67 is forward of its companion arm 50 and the length of the helical member 63 is shorter than the length of its companion member 46. Mounted upon sleeve 26 is a plate 68 carrying a bracket 69 with a bushing therein for rotatably supporting the rear end of the second drive shaft 61, and attached to the shaft adjacent this bracket is a sprocket 70 driven by a vertically extending chain portion 71. Drive means 80 as seen in FIG. 8, provides a power take-off shaft 81 which drives an endless chain around sprockets 53 and 70 and around idler sprockets 82, 83 and 84. The horizontal reaches of this chain passes under the butt ends of the speared stalks and above the top of the stalk stubs in the ground as the machine is propelled forwardly. At the same time, motor 80 provides a power take-off shaft 85 for driving a pair of conventional gathering chains 88 and 89 (FIG. 2) which have the usual spike projections thereon to engage and bite into the tobacco stalks immediately about their cut ends.

A chain 86 extending from shaft 85 drives a vertical shaft 87 from the lower end of which a chain 72 serves to drive the gathering chains by any suitable standard chain drive (not shown). For example, such a drive may include driving sprockets which are mounted on flat plates 94 and 95 supported upon the framework. These plates have idler sprockets on the lower sides thereof guiding the driven gathering chains. Supported upon rods 73 and 74 extending inwardly from posts 21 and 23, respectively, are vertical shafts 90 and 91 carrying at their lower ends a pair of cutting discs 92 and 93. At least one of these shafts is rotated by any suitable means (not shown) and the cutting discs, which are conventional, are so located as to cut the tobacco stalk adjacent the ground. As best shown in FIGS. 1 and 10, the frame of the assembly 10 supports right and left hand upper and lower pairs of forwardly projecting and downwardly inclined sheet metal shrouds 96, 97 and 98, 99. These shrouds engage the standing stalk while it is being cut by the discs and also serve to brush the tobacco leaves into positions at which damage thereto will be minimized. As such, the use and construction of the shrouds is conventional. Likewise, a shroud (not shown) will normally be employed to shield the wheel 16. The upper shrouds 96 and 97 merge at their rearward ends into sheets 100 and 101 which overly and shield the above described adjustable supports for the spearing apparatus. Likewise, the lower shrouds 98 and 99 merge at their rearward ends into sheets 102 and 103 along which the lower tobacco leaves on the speared stalk may move as the stalk moves rearwardly. In general, each of the described sheets lie in planes inclined downwardly from the vertical at about 60°. As will be appreciated, the chains 49 and 66 and the sprockets 48 and 65 which drive the helical members from their front ends are shielded by the shrouds and sheets so that tobacco leaves cannot whip into engagement therewith.

Having thus described generally one form of harvesting apparatus with which the present invention may be employed, reference now is made to the floating spear assembly forming a significant feature of the invention. As best seen in FIGS. 3, 4 and 9, the spear element comprises a forward head 110 having a forwardly projecting point 111 which pierces the stalk and begins the longitudinal split at the center line of that stalk. A rear head 112 is spaced from the forward head by means of a pair of round rods 113 and 114, the ends of which are seated in sockets formed in the two heads. Surrounding the two rods and freely rotatable thereon are tubular rollers 115 to 128 inclusive. The adjacent rollers on each rod are separated by rigidly mounted flat key plates 129 to 134 inclusive. As best seen in FIG. 7, these plates comprise symmetrically shaped upper and lower portions having apertures therethrough for reception of the rods 113 and 114 and a central aperture for receiving a threaded spacing rod 135. The spacing rod is fastened as by nuts in recesses 136 and 137 provided in the elements of the spear and is threaded throughout its length. By means of a pair of nuts engaging opposite sides of each plate as indicated by nuts 138 and 139 associated with plate 129 (FIG. 4), the plates are held in rigid position corresponding to the planes of travel of the slots in the turns of the helical members 46 and 63, as later to be described. These helical members have a plurality of radial spokes 55 and 56 joining their respective shafts with the helical turns and affording a rigid construction within the helical member itself. Moreover, the extreme forward and rearward ends of the helical turns in each member are rigidly attached to the central shaft of the member. Thus, the rigid construction of the helical member prevents it from flexing under the stresses resulting from the pushing of the tobacco stalk.

Each key plate is formed with convex curvatures 140 and 141 on its side edges and these curvatures are defined by radii R and R' of equal length extending from center points located away from the sides of the spear. Such curvatures are also symmetrical with respect to a plane including the axes of the rods 113 and 114, and these radii have lengths less than the distances from the center points to the nearest surfaces of the rollers on those rods, as best seen in FIG. 7.

Since any snagging of a stalk moving along the spear must be avoided, the forward head 110 includes not only the projecting point 111, but also a split-enlarging section in the form of a web 109 integral with the point 111 and smoothly merging into the transverse dimensions of the rear end of the forward head 110. Thus, the split-enlarging section insures a split in the tobacco stalk which will accommodate the transverse cross section of the remainder of the spear as the stalk is passed therealong.

As shown in FIG. 9, the helical member 46 is provided with circumferentially and longitudinally spaced slots 142 to 147 inclusive on the outer periphery of its helical turns. Likewise, the helical member 63 is provided with similar slots 148 to 153 inclusive. The respective helical members may turn in the same direction and with the same pitch as herein shown, in which event their helical turns are displaced 180° out of phase; or they may turn in opposite directions with a reverse pitch. In either event, it is a feature of the invention that during their simultaneous rotation those portions of the helical turns of each member which is intersected by a plane normal to the axis of the spear will make their closest approach to the spear substantially simultaneously. Considering now the mounting arrangement seen in FIG. 3, a right hand bracket 160 (as viewed in the direction of travel of the spearing assembly of FIG. 5) is supported inwardly from clamp plate 39 and carries upper and lower rollers 161 and 162 which cradle the central turns of the helical member 46. Likewise, a left-hand bracket 163 is supported inwardly from clamp plate 37 and carries upper and lower rollers 164 and 165 cradling those central turns of the other helical member 63. Supported in floating position between and upon the helical members is the spear above described and with its key plate 129 arranged in the same plane as the respective slots 142 and 148 in the helical members 46 and 63. The other key plates and slots are similarly related and engagement of the array of plates and slots (typified by FIG. 9) follows a sequence of engaged plates in the order 129, 132, 130, 133, 131 and 134 during the spearing operation. As will now be apparent, a cut stalk of tobacco entering the space between the forwardmost ends of the helical members as indicated at S in FIG. 5 is engaged by the leading turn portions 170 and 171 of the rotating members and is cammed into position S1. It will be understood that these leading turn portions need not be of uniform helical configuration since they do not support or engage with the floating spear, and further that the cut stalk also is being guided by the engagement of the spiked chains 88 and 89 with the butt portion of the severed stalk and thus is being held in a generally vertical position. Continued rotation of the helical members therefore, cams the stalk rearwardly and a piercing of the stalk at its center line occurs when it contacts the point 111 of the spear. The distance between the cut end of the stalk and this point of piercing may of course, be adjusted merely by raising or lowering the sleeves 25, 26, 27 and 28 on their respective posts. In general the spear head, as shown in FIG. 6, has a height dimension of about four inches and a width dimension of about one inch and the stalk accordingly is split sufficiently to pass over the entire spear and on to the stick located at the discharge end of the spear. Further rotation of the helical members carries the now split stalk to position S2 rearwardly of the key plate 129 which during the passage of the stalk thereacross has been disengaged from the slots 142 and 148 of the helical members. In similar fashion the impaled stalk is conveyed and guided rearwardly until it reaches the position S3 at the discharge end of the spear. At this time further movement of the stalk on to the stick 175 and from an adapter which is attached to the rear head of the spear, is effected by intermittently driven apparatus associated with the stick magazine and stick filling assembly 11 and which forms no part of the present invention. In general, movement of the speared stalk to the stick embodies apparatus including an upper helical conveyor 177 (FIG. 1) and which is inclined both horizontally and vertically from the axis of the floating spear. As best seen in FIGS. 11 and 12, the adaptor includes a plate 178 fastened flush against the rear surface of the rear head 112 of the spear as by means of headed screws 179. Integrally fixed to this plate is a generally vertical wall portion 180 having an upwardly inclined socket 181 at its rear end and into which one end of stick 175 is detachably engaged. A leaf spring 182 mounted upon the wall portion 180 engages the stick in order to hold it in the socket during the stick filling operation. Due to the difference in lengths of the helical members 46 and 63, the adaptor does not interfere with the rotation of those members as the stalk is discharged from the floating spear.

Again referring to FIGS. 3 and 9, it will be seen that the outer peripheral surfaces of each of the helical members are in rolling contact with a plurality of upper and lower rollers on the spear and also the turns located near the mid section of the elongated body portion of the spear are additionally in rolling contact with the upper and lower rollers mounted upon the clamp plates. This feature is important in that friction is greatly reduced and at the same time extraneous material associated with tobacco stalks, such as dirt and gum, are scraped from the helical members and the spear. The slotted nature of the helical members does not detract from the rolling contact of the unslotted portion of the helical turns.

With the above in mind, the arrangement by which the floating spear is held in its predetermined spearing position despite the force vectors established by the camming action of the rotating helical members will now be evident. For example, with reference to FIG. 3, as helical member 63 turns clockwise its slot 150 receives the lower edge of the concave wall 140 of the flat key plate 131 and thus locks the spear against forward or rearward motion. Simultaneously, the slot 144 of helical member 46 receives the upper edge of the opposite concave wall 141 of that same key plate 131 and additionally holds the spear against longitudinal movement. During this engagement of key plate 131, a tobacco stalk impaled on the spear cannot pass plate 131, but due to the number of helical turns provided in advance of plate 131, no stalk is permitted to approach plate 131 at this time despite the fact that stalks may enter the apparatus with random spacings therebetween. The permitted passage of stalks along the spear is, of course, related to the above described order in which the key plates engage in the respective slots. For example, by the time the helical members have rotated sufficiently to disengage slots 150 and 144 from plate 131, they also have rotated sufficiently far to engage slots 147 and 153 with key plate 134. The floating spear thus is held at all times against longitudinal movement. As the helical turns approach and depart from their engagements with the key plates, they in effect act as opening and closing gates located ahead of and behind the stalks which are being moved along the spear.

As diagrammatically shown in FIG. 10, as the apparatus approaches an uncut stalk, one of the cutting discs severs the stalk and at the same time one of the spiked gathering chains engages the cut stalk at its lower end and brings it into engagement with the other spiked chain. At the same time the forwardly projecting shrouds center the cut stalk and funnels its movement into a path wherein it is engaged by the leading turns 170 and 171 of the helical members at which time it occupies the position S1, shown in FIG. 5. Thereafter continued rotation of the helical members conveys and guides the stalk toward the discharge end of the spear as above described. This same action occurs for stalks of varying diameters and heights.

Various additional structural features may be employed with the apparatus without departing from the invention and are omitted herefrom in the interest of clarity since they are not regarded as part of the present invention. For example, the bars 43 and 60 of the adjustable supports may mount spring-loaded guides (not shown) which engage the tobacco stalks intermediate their lower cut ends and the stalk portions thereof which are to engage the rotating helical members, thus to further assist in guiding the stalk into proper contact with the point of the spear.

Having thus described the floating spear assembly, the several advantages of the invention will now be apparent. For example, the cradled arrangement of the spear and helical members is found to reduce stoppages in operation and to permit a comparatively slow speed of moving parts and a compact assembly without detracting from the capacity of the machine. It is found that with a spear about 26 inches in length and with helical members of four-inch diameter, and 4½-inch pitch, a rotation of 144 r.p.m. for those members normally results in discharge of sufficient stalks to load six sticks per minute. The construction of the spear head which promptly opens a split in the stalk large enough to accommodate the remainder of the spear and later the stick, and which forms this split while the stalk is properly aligned with the spear point, is found to result in a reduced number of stalks later falling from sticks during the curing process, as contrasted with manually speared stalks. The wiping contact between the slots of the helical members and the key plates of the spear, as well as between the helical turns and the rollers both on the spear and on the support structure mounted on the frame, is found to remove extraneous material which might otherwise add to friction and wear.

Although the invention has been described with reference to particular embodiments thereof, it is to be understood that numerous modifications may be made by those skilled in the art without actually departing from the invention. It is, therefore, a purpose of the appended claims to cover all such equivalent variations as come within the true spirit and scope of the claims.

What I claim as new and desire to secure by Letters Patent, is:

1. In a tobacco stalk spearing apparatus, a pair of rotatable helical members for engaging the stalk therebetween and for guiding it over a spear, means for driving said members simultaneously, and a floating spear supported between and against said helical members; said spear having a forwardly directed spear head for piercing the stalk conveyed thereto by said members during their rotation, an elongated body portion for holding the pierced stalk as it is moved rearwardly by continued rotation of said members and including a plurality of flat key plates spaced longitudinally of said body portion, and a rear head from which the pierced stalk is discharged by further continued rotation of said members; each of said members having slots formed in a plurality of helical turns thereof and periodically engageable with a respective one of said plates thereby to retain said floating spear in a predetermined spearing position; and each of said members being so positioned that during their rotation those portions of their respective helical turns intersected by a plane normal to the axis of said spear will make their closest approach to said spear substantially simultaneously.

2. Apparatus as defined in claim 1 wherein said spear includes at least six of said plates and each of said helical members includes at least six slots.

3. Means for impaling tobacco stalks on a spear comprising, a frame having upright posts at opposite sides thereof, support means mounted upon said posts and including first and second generally parallel rods spaced from each other and extending generally longitudinally of the axis of travel of the stalks being impaled, first and second helical members supported at the ends upon said rods, means supported by said rods for driving said members simultaneously, a floating spear supported between and against said helical members, and means carried by said spear and engageable with said helical members for preventing shifting of said spear with respect to said helical members; said spear having a forwardly directed spear head for piercing the stalk conveyed thereto by said members as they rotate, an elongated body portion for holding the pierced stalk as it is moved rearwardly by continued rotation of said members, and a rear head from which the pierced stalk is discharged by further continued rotation of said members.

4. Apparatus as defined in claim 3 wherein said support means is selectively adjustable vertically of said posts thereby to vary the vertical location occupied by said spear.

5. Apparatus as defined in claim 3 wherein said support means positions the rear end of said helical members and of said spear at a higher elevation than the front ends thereof.

6. Apparatus as defined in claim 3 wherein said support means comprises sleeves adjustably mounted upon said posts and including first and second clamps rigidly supported by the respective sleeves and adjustably clamping said first and second rods adjacent the midlengths of the respective rods.

7. Apparatus as defined in claim 3 wherein said spear is supported upon said helical members by means of rollers forming a portion of said spear between said forwardly directed spear head and said rear spear head.

8. Means for impaling tobacco stalks on a spear comprising a frame having vertical posts at opposite sides thereof, support means mounted upon said posts and including first and second generally parallel rods spaced from each other and extending longitudinally of the axis of travel of the stalks being impaled, first and second helical members supported at the ends by said rods, first and second brackets supported by said rods intermediate the ends of said rods, rollers carried by the respective brackets and disposed in contact with the turns of said helical members, means supported by said rods for driving said members simultaneously, a floating spear supported between and against said helical members intermediate the ends of said helical members, and means carried by said spear and engageable with said helical members for preventing shifting of said spear with respect to said helical members; said spear having a forwardly directed spear head for piercing the stalk conveyed thereto by said members as they rotate, an elongated body portion for holding the pierced stalk as it is moved rearwardly by continued rotation of said members, and a rear head from which the pierced stalk is discharged by further continued rotation of said members.

9. Apparatus as defined in claim 8 wherein each of said helical members is driven from the forward end thereof.

10. Apparatus as defined in claim 8 wherein one of said helical members is longer than the other helical member and with the forward ends of each helical member being substantially the same distance forwardly of said spear head.

11. Apparatus as defined in claim 8 wherein said spear is supported upon said helical members by means of rollers forming a portion of said spear between said forwardly directed spear head and said rear spear head.

12. Apparatus as defined in claim 8 wherein said means on said spear for engaging said helical members to prevent shifting of said spear is disposed in planes transversely of the axis of said spear which intersect said rollers carried by said brackets.

13. In a tobacco stalk spearing apparatus, a pair of rotatable helical members for engaging the stalk therebetween and for guiding it along a spear, means for driving said members simultaneously in the same direction of rotation, said members having their respective helical turns displaced substantially 180° from the turns of the other member and having substantially parallel axes, and a floating spear supported between and against said helical members with a wiping contact between the contacting parts thereof; said spear comprising a forward head and a rear head, a pair of spaced parallel rods separating said heads, plurality of flat key plates engaging said rods and spaced longitudinally of said spear, means connecting said heads and holding said plates in said spaced relation, and tubular rollers surrounding each of said rods in the spaces between adjacent plates and between said heads and the plates nearest thereto; said helical members having an outer diameter positioning the turns of said members in rolling and wiping contact with said rollers and said members having slots formed in a plurality of helical turns thereof and periodically engageable with a sliding and wiping contact with said key plates during rotation of said members thereby to retain said floating spear in a predetermined spearing position.

14. For use in the spearing of tobacco stalks, an elongated spear comprising a forward head and a rear head, a pair of spaced parallel rods separating said heads, a plurality of flat plates of substantially identical shape engaging said rods and spaced from each other, and means for connecting said heads and holding said plates in said mutually spaced relation; said forward head having a forwardly projecting point for forming a split in the stalk and smoothly merging into a split-enlarging section of said forward head, said split-enlarging section being sufficiently large to insure a split in the stalk which will accommodate the transverse cross section of the remainder of said spear as the stalk is passed therealong.

15. A spear as defined in claim 14 including tubular rollers surrounding each of said rods in the spaces between adjacent plates and between said heads and the plates nearest thereto, said rollers being freely and independently rotatable on said rods.

16. A spear as defined in claim 14 wherein the respective side edges of each of said plates are formed with a convex curvature on radii of uniform length from center points located away from the sides of the spear, said curvatures being symmetrical with respect to a plane including the axes of said rods and said radii having lengths less than the distances from said center points to the nearest surfaces of said rollers on said rods.

17. A spear as defined in claim 14 wherein said means for connecting said heads and holding said plates in spaced relation comprises a threaded rod having nuts securing the same to said heads and nuts on each side of each of said plates holding said plates against movement longitudinally of said threaded rod.

No references cited.

GERALD M. FORLENZA, *Primary Examiner.*

M. TEMIN, *Assistant Examiner*